United States Patent
Vannucci et al.

(10) Patent No.: US 9,285,455 B2
(45) Date of Patent: *Mar. 15, 2016

(54) ESTIMATING THE LOCATION OF A WIRELESS TERMINAL BASED ON THE LIGHTING AND ACOUSTICS IN THE VICINITY OF THE WIRELESS TERMINAL

(71) Applicant: Polaris Wireless, Inc., Mountain View, CA (US)

(72) Inventors: Giovanni Vannucci, Middletown, NJ (US); Jason Paul DeMont, Fairview, TX (US)

(73) Assignee: Polaris Wireless, Inc., Mountain View, CA (US)

(*) Notice: Subject to any disclaimer, the term of this patent is extended or adjusted under 35 U.S.C. 154(b) by 116 days.

This patent is subject to a terminal disclaimer.

(21) Appl. No.: 13/622,410

(22) Filed: Sep. 19, 2012

(65) Prior Publication Data

US 2014/0080505 A1 Mar. 20, 2014

(51) Int. Cl.
*H04W 24/00* (2009.01)
*G01S 5/02* (2010.01)

(52) U.S. Cl.
CPC ............. *G01S 5/0252* (2013.01); *G01S 5/0205* (2013.01); *G01S 5/0278* (2013.01)

(58) Field of Classification Search
CPC . H04M 2242/30; H04W 64/00; H04W 4/021; H04W 4/025; H04W 64/003; G01S 5/0205; G01S 5/0252; G01S 5/0278
USPC ........................................................ 455/456.1
See application file for complete search history.

(56) References Cited

U.S. PATENT DOCUMENTS

| | | | |
|---|---|---|---|
| 5,598,000 A | 1/1997 | Popat | |
| 6,529,164 B1 | 3/2003 | Carter | |
| 2004/0204026 A1* | 10/2004 | Steer et al. | 455/550.1 |
| 2010/0187406 A1 | 7/2010 | Van Dalen et al. | |
| 2011/0029370 A1* | 2/2011 | Roeding et al. | 705/14.38 |
| 2012/0052872 A1* | 3/2012 | Do | 455/456.1 |
| 2012/0083285 A1* | 4/2012 | Shatsky et al. | 455/456.1 |
| 2012/0191512 A1* | 7/2012 | Wuoti et al. | 705/14.1 |

(Continued)

OTHER PUBLICATIONS

"Office Action, dated May 27, 2015, issued in related U.S. Appl. No. 13/622,408".

(Continued)

*Primary Examiner* — Timothy Pham
(74) *Attorney, Agent, or Firm* — Kaplan Breyer Schwarz & Ottesen, LLP

(57) ABSTRACT

A technique is disclosed for estimating the location of a wireless terminal at an unknown location in a geographic region. The technique is based on a two-part recognition, the first part being that there are certain optical and acoustic characteristics that are present in some environments while not being present in others, such as lighting flicker and sound reverberation. The second part of the recognition is that a correlation exists between the presence of flicker and reverberation in the vicinity of a wireless terminal and whether the wireless terminal is indoors or not. Under certain environmental conditions, flicker and reverberation are often present indoors but not outdoors. By accounting for flicker and reverberation being detected or not being detected in the vicinity of the wireless terminal, the disclosed technique is able to estimate whether the wireless terminal is indoors, which the technique also uses to improve the location estimate.

20 Claims, 14 Drawing Sheets

(56) References Cited

U.S. PATENT DOCUMENTS

| | | | |
|---|---|---|---|
| 2012/0214515 A1* | 8/2012 | Davis et al. | 455/456.3 |
| 2012/0252495 A1* | 10/2012 | Moeglein et al. | 455/456.3 |
| 2013/0311080 A1* | 11/2013 | Wirola et al. | 701/409 |
| 2013/0336093 A1* | 12/2013 | Suvanto | 367/99 |
| 2014/0002307 A1* | 1/2014 | Mole et al. | 342/451 |

OTHER PUBLICATIONS

"Office Action, dated Nov. 7, 2014, issued in related U.S. Appl. No. 13/622,408".

* cited by examiner

ESTIMATING THE LOCATION OF A WIRELESS TERMINAL BASED ON THE LIGHTING AND ACOUSTICS IN THE VICINITY OF THE WIRELESS TERMINAL

CROSS REFERENCE TO RELATED APPLICATIONS

This application is related to "Estimating the Location of a Wireless Terminal Based on the Lighting and Acoustics in the Vicinity of the Wireless Terminal," application Ser. No. 13/622,408, filed on the same day as the present application and incorporated by reference in its entirety.

FIELD OF THE INVENTION

The present invention relates to telecommunications in general, and, more particularly, to a technique for estimating the location of a wireless terminal based on the lighting and acoustic environment in the vicinity of the wireless terminal.

BACKGROUND OF THE INVENTION

FIG. 1 depicts a diagram of the salient components of wireless telecommunications system 100 in accordance with the prior art. Wireless telecommunications system 100 comprises: wireless terminal 101, base stations 102-1, 102-2, and 102-3, wireless switching center 111, and location client 112, interrelated as shown. Wireless telecommunications system 100 provides wireless telecommunications service to all of geographic region 120, in well-known fashion.

The salient advantage of wireless telecommunications over wireline telecommunications is the mobility that is afforded to the user of the wireless terminal. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

In some environments, however, signals that are too weak to be usable and environmental conditions that are insufficiently or incorrectly characterized can cause at least some location estimation techniques to produce unreliable location estimates. For example, some indoor environments can cause such problems to occur. Therefore, the need exists for a technique for estimating the location of a wireless terminal in a wireless telecommunications environment that includes both indoor and outdoor areas.

SUMMARY OF THE INVENTION

There are a number of systems in the prior art for estimating the location of a wireless terminal. Several of the factors that affect the accuracy of the estimate are:

1. whether the signals that travel to and from the wireless terminal are impaired (e.g., attenuated, reflected, refracted, etc.) or not,
2. whether the system knows if the signals have been impaired or not, and
3. whether the system compensates for the impairment or not.

When the system knows that the signals have been impaired and compensates for the impairment, the accuracy of the estimate can be very good. In contrast, when the system does not know that the signals have been impaired or does not compensate for the impairment, the accuracy of the estimate can be very bad. The military, police, and emergency services often rely on the estimates to be good and a bad estimate can have serious consequences.

Signals can be impaired by natural objects such as mountains and by man-made objects such as buildings. The impairment caused when a wireless terminal is indoors is particularly insidious, and it is particularly difficult (in the prior art) to know that the wireless terminal is indoors.

To address this problem, embodiments of the present invention estimate whether a wireless terminal is indoors or outdoors. Although it is trivial for a human to know whether he or she is indoors or outdoors, and it might seem that it should be simple for a machine to know whether it is indoors or not, it has, until the present invention, been a difficult problem.

Embodiments of the present invention estimate whether the wireless terminal is indoors or not by analyzing the lighting environment and/or acoustic environment in the vicinity of the wireless terminal. For example, a characteristic of the lighting environment that is probative of whether a wireless terminal is indoors or outdoors is flicker, which is a repetitive fluctuation in the brightness of light.

Some flicker is perceptible to humans and some is not. For example, the flicker of a candle is perceptible because the frequency and amplitude of the flicker is within the range of human perception. In contrast, when either the frequency or amplitude is outside the range of human perception, the flicker is not perceptible. In general, the flicker of most electrical lighting is designed to be imperceptible to most people.

Flicker can be caused by many things, but flicker in electrical lighting is usually caused by the temporal variation in the power supply to the light source. For example, when an alternating current powers an incandescent lamp, the alternating current cycles on and off, which causes corresponding changes in the light produced by the lamp, resulting in flicker. In many modern light sources, power conversion in the drive circuit is an additional source of flicker. In general, most electrical lighting exhibits flicker.

In contrast, sunshine does not exhibit flicker. Because man-made light is more prevalent indoors than outdoors and sunshine is more prevalent outdoors than indoors—at least during daylight and when it is not heavily overcast—an analysis of the frequency and amplitude of flicker in the vicinity of a wireless terminal is probative of whether the wireless terminal is indoors or outdoors. In practice, many locations during the day are illuminated by a combination of man-made light and sunshine, and, therefore, an analysis of flicker relative to the total illumination indicates whether the illumination at a location is dominated by sunshine or man-made light, and, therefore, whether the location is more likely to be indoors or outdoors.

A characteristic of the acoustic environment that is probative of whether a wireless terminal is indoors or outdoors is reverberation. Reverberation is the persistence of sound in a particular space after the original sound is produced and is caused by one or more reflections of the original sound by objects in the environment. The geometry and the materials in the environment also affect reverberation.

For example, there is little reverberation outdoors in a field, but there is a lot of reverberation in a tile bathroom. And the reverberation in a wooden barn is very different than the reverberation in a tile bathroom. In general, there is a difference in the quantity and quality of reverberation between indoors and outdoors, and, therefore, an analysis of the reverberation in the vicinity of a wireless terminal is probative of whether the wireless terminal is indoors or outdoors.

In some embodiments of the present invention, the wireless terminal measures a sample of sound in its vicinity and generates a characterization of reverberation that indicates the number and strength of reflections observable in the sample of sound. In some embodiments of the present invention, the sample of sound comprises sounds that are naturally present in the environment such as, for example, the sounds of people talking or of vehicles operating nearby. In some embodiments of the present invention, the sound sample comprises sounds that are generated by the wireless terminal itself. For example, the wireless terminal might use its microphone to measure a sample of sound while it is ringing. Such a sample of sound would then comprise the ringtone, as detected by the microphone. The detected ringtone would exhibit reverberation in accordance with the characteristics of the surrounding environment. The fact that the sound was generated by the wireless terminal facilitates the analysis of the measured sample of sound.

As mentioned in the previous paragraph, the analysis is facilitated when the wireless terminal generates sounds while measuring a sample of sound. In the example of the previous paragraph, a sample of sound is measured when the wireless terminal is generating a sound as part of its normal operations. It is also possible for the wireless terminal to purposely generate a sound while measuring a sample of sound for the express purpose of achieving a better characterization of reverberation. Such purposely generated sounds might be within the audible range, or outside the audible range; for example, they might be ultrasounds at frequencies that are inaudible by humans. Generating ultrasonic sounds is advantageous because it enables the wireless terminal to characterize the reverberation environment without inconveniencing nearby people with unwanted sounds.

For these reasons, an analysis of the characteristics of flicker and an analysis of the characteristics of reverberation, either alone or together, are probative of whether the wireless terminal is more likely to be indoors or outdoors.

An illustrative embodiment of the present invention comprises: measuring, by a wireless terminal, a sample of sound in the vicinity of the wireless terminal; generating, by the wireless terminal, a characterization of reverberation in the vicinity of the wireless terminal based on the sample of sound in the vicinity of the wireless terminal; and generating, by the wireless terminal, an estimate of the probability that the wireless terminal is indoors based on the characterization of reverberation in the vicinity of the wireless terminal.

DETAILED DESCRIPTION

Overview

Figure 1:
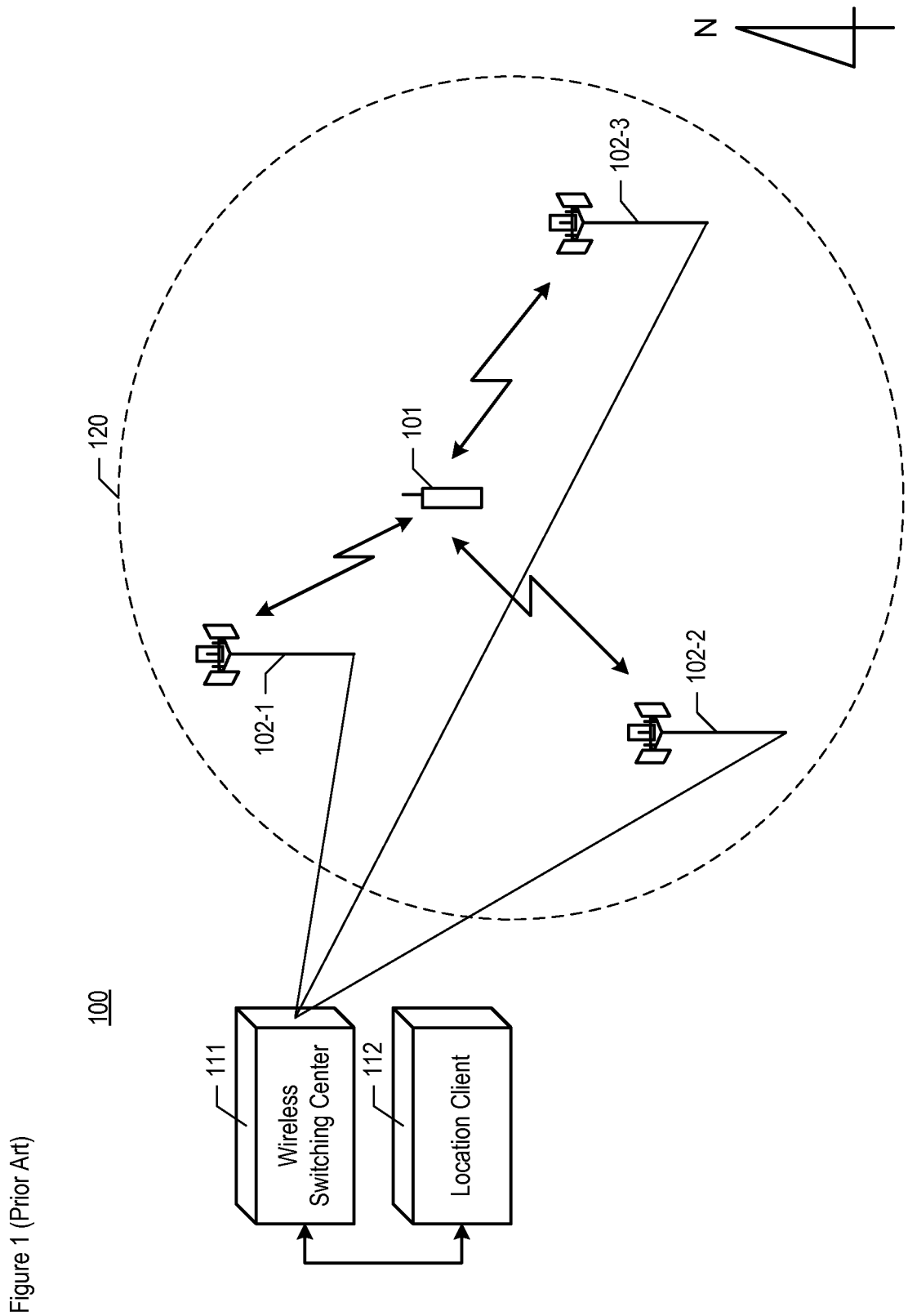
FIG. 1 depicts a diagram of the salient components of wireless telecommunications system 100 in the prior art.
Figure 2:
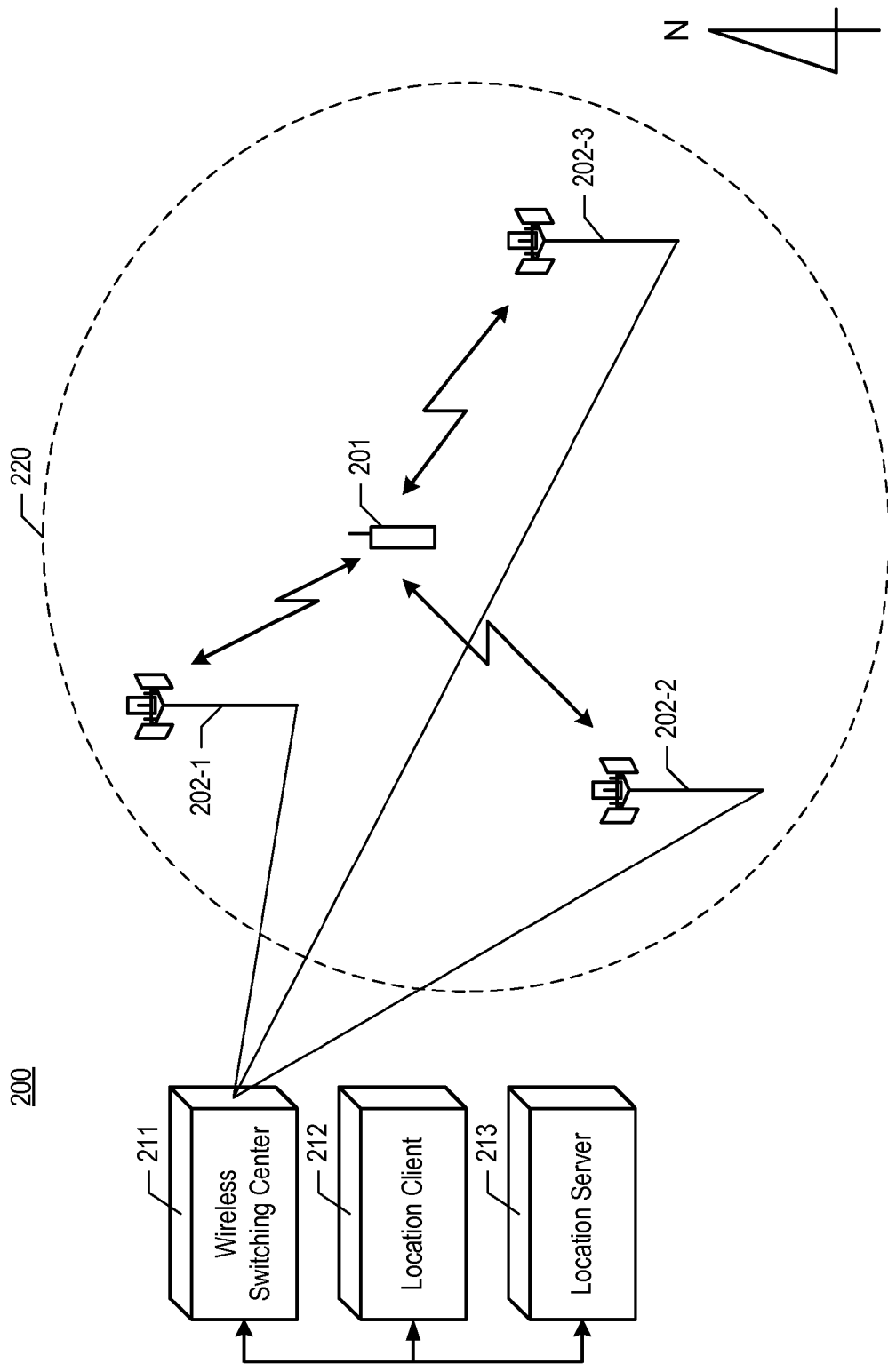
FIG. 2 depicts a diagram of the salient components of wireless telecommunications system 200 in accordance with the illustrative embodiment of the present invention.

FIG. 2 depicts a diagram of the salient components of wireless telecommunications system 200 in accordance with the illustrative embodiment of the present invention. Wireless telecommunications system 200 comprises: wireless terminal 201, base stations 202-1, 202-2, and 202-3, wireless switching center 211, location client 212, and location server 213, which are interrelated as shown. The illustrative embodiment provides wireless telecommunications service to all of geographic region 220, in well-known fashion, estimates the location of wireless terminal 201 within geographic region 220, and uses that estimate in a location-based application.

In accordance with the illustrative embodiment, wireless telecommunications service is provided to wireless terminal 201 in accordance with the Long Term Evolution (LTE) air-interface standard. After reading this disclosure, however, it will be clear to those skilled in the art how to make and use alternative embodiments of the present invention that operate in accordance with one or more other air-interface standards (e.g., Universal Mobile Telecommunications System "UMTS", Global System for Mobile Communications "GSM," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201 comprises the hardware and software necessary to be LTE-compliant and to perform the processes described below and in the accompanying figures. For example and without limitation, wireless terminal 201 is capable of:

i. measuring one or more location-dependent traits (e.g., signal strength, etc.) of one of more electromagnetic signals and of reporting the measurements to location server 213,
  ii. transmitting one or more signals and of reporting the transmission parameters of the signals to location server 213,
  iii. measuring samples of light and sound in its vicinity, and
  iv. transmitting characterizations of flicker and reverberation in its vicinity, based on the samples of light and sound, respectively.

Wireless terminal 201 is mobile and can be at any location within geographic region 220. Although wireless telecommunications system 200 as depicted comprises only one wireless terminal, it will be clear to those skilled in the art, after reading this disclosure, how to make and use alternative embodiments of the present invention that comprise any number of wireless terminals.

Base stations 202-1 through 202-3 communicate with wireless terminal 201 via radio and with wireless switching center 211, all in well-known fashion. In accordance with the illustrative embodiment, each of base stations 202-1 through 202-3 has one or more antennas that are associated with the base station, in order to enable communication with wireless terminal 201. As is well known to those skilled in the art, base stations are also commonly referred to by a variety of alternative names such as access points, nodes (e.g., Node-B, eNode-B, etc.), network interfaces, etc.

Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, the base stations are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Wireless switching center 211 comprises a switch that orchestrates the provisioning of telecommunications service to wireless terminal 201 and the flow of information to and from location server 213, as described below and in the accompanying figures. As is well known to those skilled in the art, wireless switching centers are also commonly referred to by other names such as mobility management entities (MME), mobile switching centers (MSC), mobile telephone switching offices (MTSO), routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

Location client 212 comprises hardware and software that use the estimate of the location of wireless terminal 201—provided by location server 213—in a location-based application, as described below and in the accompanying figures.

Location server 213 comprises hardware and software that generate one or more estimates of the location of wireless terminal 201 as described below and in the accompanying figures. It will be clear to those skilled in the art, after reading this disclosure, how to make and use location server 213. Furthermore, although location server 213 is depicted in FIG. 2 as physically distinct from wireless switching center 211, it will be clear to those skilled in the art, after reading this disclosure, how to make and use alternative embodiments of the present invention in which location server 213 is wholly or partially integrated with wireless switching center 211.

In accordance with the illustrative embodiment, location server 213 communicates with wireless switching center 211 and location client 212 via a local area network; however it will be clear to those skilled in the art, after reading this disclosure, how to make and use alternative embodiments of the present invention in which location server 213 communicates with one or more of these entities via a different network such as, for example, the Internet, the Public Switched Telephone Network (PSTN), etc.

In accordance with the illustrative embodiment, wireless switching center 211, location client 212, and location server 213 are outside of geographic region 220. It will be clear to those skilled in the art, after reading this disclosure, how to make and use alternative embodiments of the present invention in which some or all of wireless switching center 211, location client 212, and location server 213 are instead within geographic region 220.

Wireless Terminal 201

Figure 3:
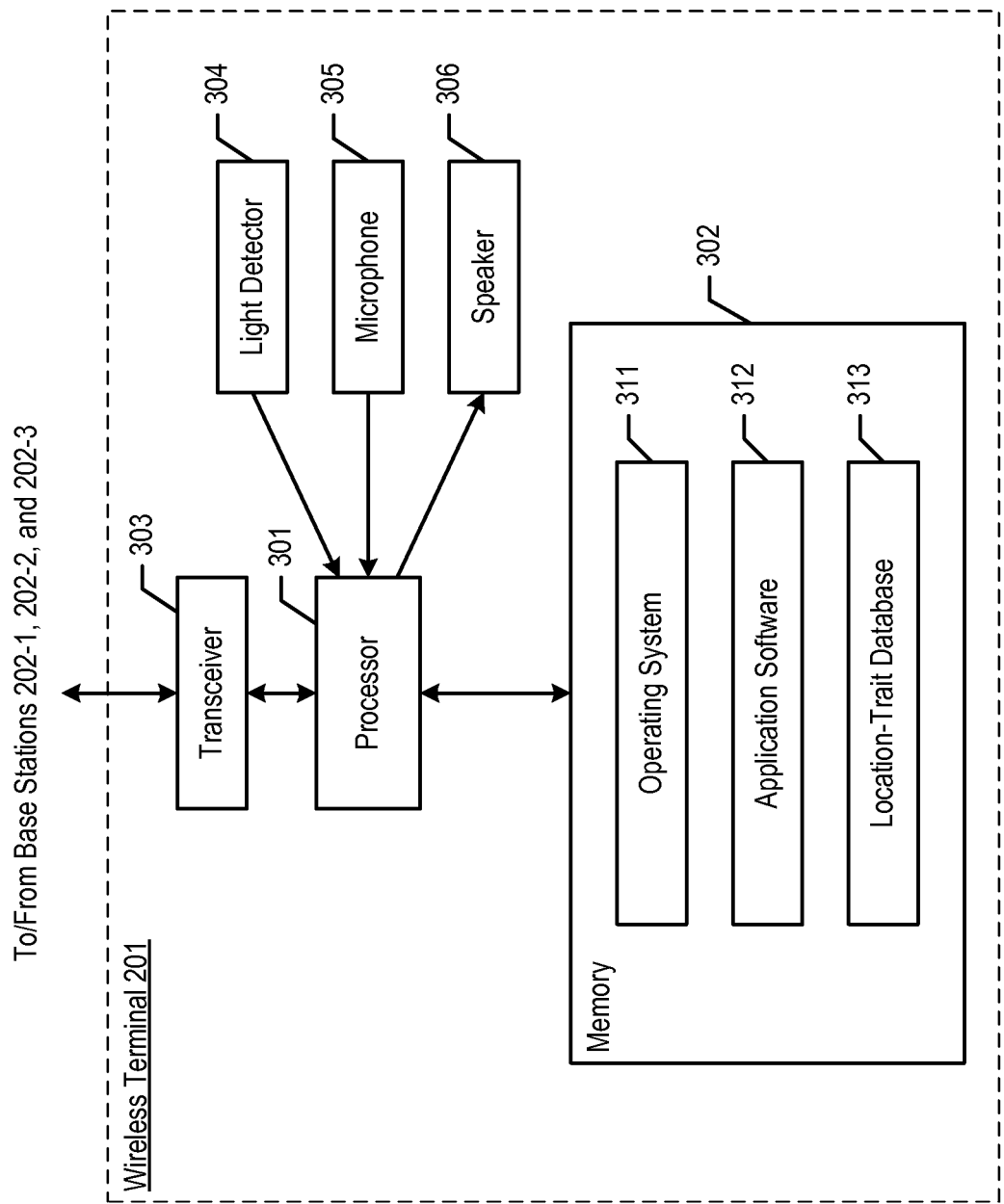
FIG. 3 depicts a block diagram of the salient components of wireless terminal 201 in accordance with the illustrative embodiment.

FIG. 3 depicts a block diagram of the salient components of wireless terminal 201 in accordance with the illustrative embodiment. Wireless terminal 201 comprises: processor 301, memory 302, transceiver 303, light detector 304, microphone 305, and speaker 306, which are interconnected as shown.

Processor 301 is a general-purpose processor that is capable of executing operating system 311 and application software 312, and of populating, amending, using, and managing Location-Trait Database 313, as described in detail below and in the accompanying figures. It will be clear to those skilled in the art how to make and use processor 301.

Memory 302 is a non-volatile memory that stores:
  i. operating system 311, and
  ii. application software 312, and
  iii. Location-Trait Database 313.

It will be clear to those skilled in the art how to make and use memory 302.

Transceiver 303 enables wireless terminal 201 to transmit and receive information to and from base stations 202-1, 202-2, and 202-3. In addition, transceiver 303 enables wireless terminal 201 to transmit information to and receive information from location server 213 via one or more base stations and wireless switching center 211. It will be clear to those skilled in the art how to make and use transceiver 303.

Light detector 304 enables wireless terminal 201 to measure one or more samples of light in the vicinity of the wireless terminal. In the illustrative embodiment, light detector 304 is device that is part of a camera built into wireless terminal 201. It will be clear to those skilled in the art, however, after reading this specification, how to make and use embodiments of the present invention in which light detector 304 is a different device, which either is also used by a pre-existing function at the wireless terminal or is dedicated to the measuring of samples of light. In any event, it will be clear to those skilled in the art how to make and use light detector 304.

Microphone 305 enables wireless terminal 201 to measure one or more samples of sound in the vicinity of the wireless terminal. In the illustrative embodiment, microphone 305 is the transducer used by wireless terminal 201 to convert the acoustic speech signals of the terminal's user into electrical signals. It will be clear to those skilled in the art, however, after reading this specification, how to make and use embodiments of the present invention in which microphone is a different device, which either is also used by a pre-existing function at the wireless terminal or is dedicated to the measuring of samples of sound. In any event, it will be clear to those skilled in the art how to make and use microphone 305.

Speaker 306 enables wireless terminal 201 to produce sound in response to an electrical audio signal input. It will be clear to those skilled in the art how to make and use speaker 306.

Location Server 213

Figure 4:
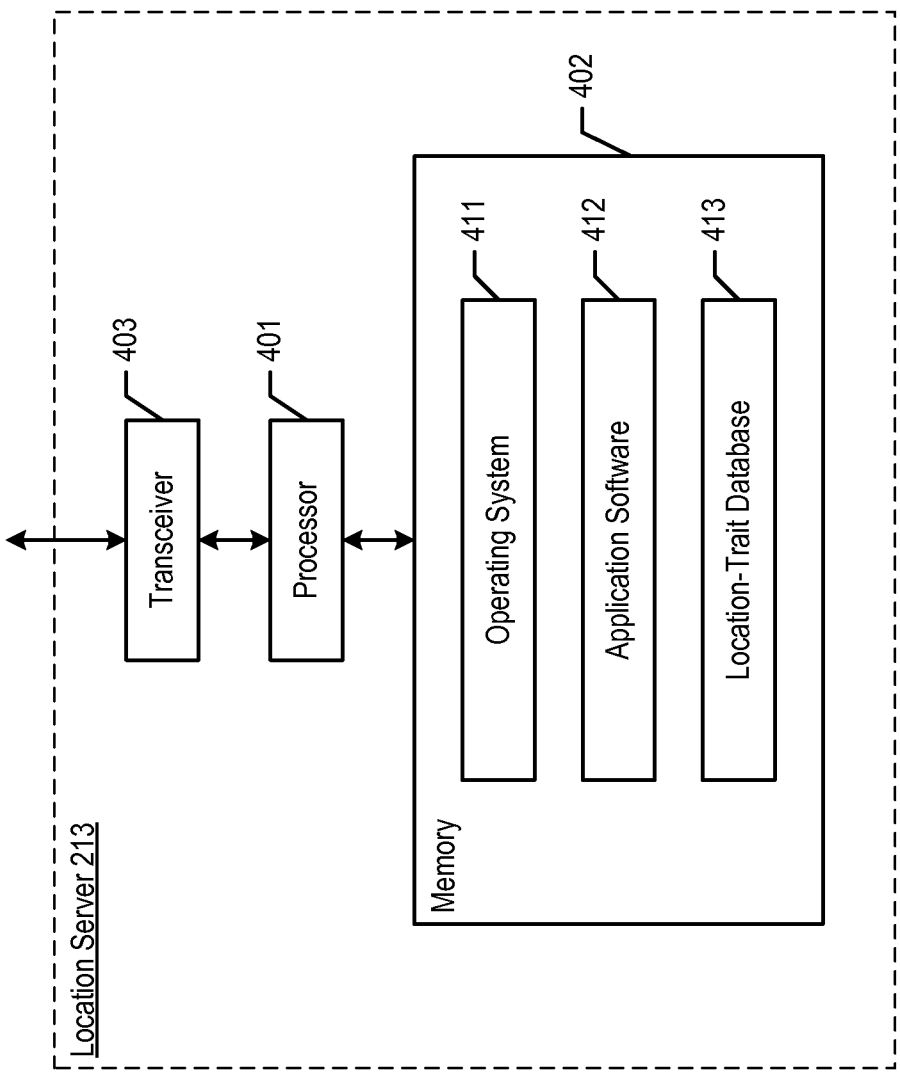
FIG. 4 depicts a block diagram of the salient components of location server 213 in accordance with the illustrative embodiment.

FIG. 4 depicts a block diagram of the salient components of location server 213 in accordance with the illustrative embodiment. Location server 213 comprises: processor 401, memory 402, and local-area network transceiver 403, which are interconnected as shown.

Processor 401 is a general-purpose processor that is capable of executing operating system 411 and application software 412, and of populating, amending, using, and managing Location-Trait Database 413, as described in detail below and in the accompanying figures. It will be clear to those skilled in the art how to make and use processor 401.

Memory 402 is a non-volatile memory that stores:
i. operating system 411, and
ii. application software 412, and
iii. Location-Trait Database 413.
It will be clear to those skilled in the art how to make and use memory 402.

Transceiver 403 enables location server 213 to transmit and receive information to and from wireless switching center 211 and location client 212. In addition, transceiver 403 enables location server 213 to transmit information to and receive information from wireless terminal 201 and base stations 202-1, 202-2, and 202-3 via wireless switching center 211. It will be clear to those skilled in the art how to make and use transceiver 403.

Radio Frequency Map of the Illustrative Embodiment

Figure 5:
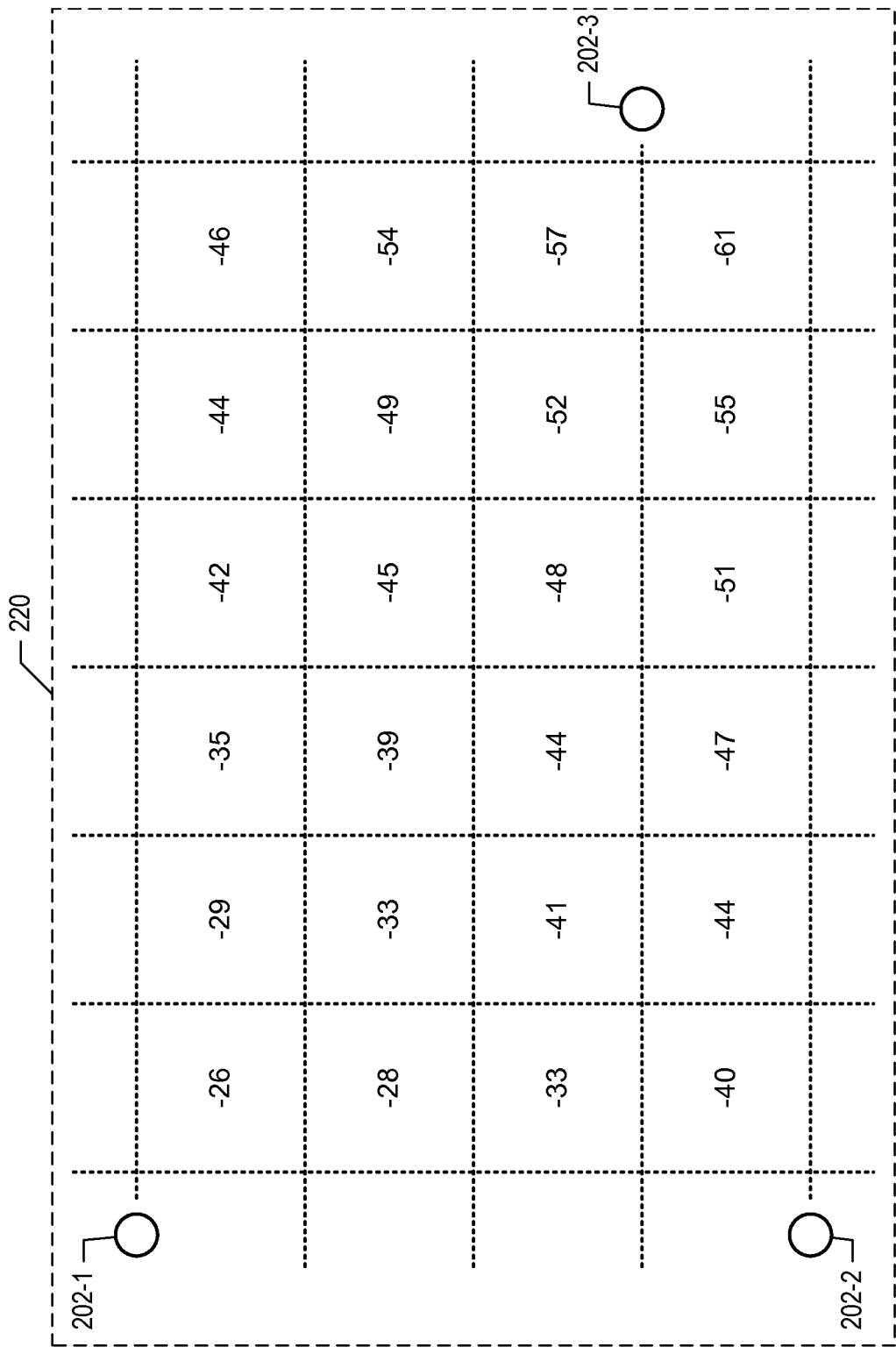
FIG. 5 depicts a radio frequency (RF) map that represents a partitioning of geographic region 220.

FIG. 5 depicts a radio frequency (RF) map that represents a partitioning of geographic region 220 into 24 square locations. The maps are maintained as part of Location-Trait Databases 313 and 413, which are situated at wireless terminal 201 and location server 213, respectively. In general, the map associates:
i. a plurality of possible locations of wireless terminal 201, with
ii. a predicted value of a location-dependent trait for each of the possible locations.

In other words, when wireless terminal 201 is at an unknown location, an empirical measurement of the location-dependent trait is a "fingerprint" or "signature" that can be used, in conjunction with the map, to estimate the location of the wireless terminal.

In accordance with the illustrative embodiment of the present invention, the location-dependent trait is the received signal strength as measured in dBm, and each map associates each possible location of wireless terminal 201 with the predicted received signal strength of one signal as transmitted from an antenna of a particular base station—in this case, base station 202-1—and as a function of the calendrical time, T, and the environmental conditions, N. With this in mind, FIG. 5 indicates the mapping of the signal radiated by the antenna of base station 202-1 at Noon on a sunny day. Each of the base station 202-2 and 202-3 antennas similarly has a map that associates each possible location of wireless terminal 201 with the predicted received signal strength of one signal as transmitted from the antenna of the particular base station. How each map is generated is described below and in FIG. 7.

It will, however, be clear to those skilled in the art, after reading this specification, how to make and use alternative embodiments of the present invention in which one or more of the following predicted traits are used, instead of or in addition to the trait of received signal strength:

i. the predicted pathloss of all of the signals receivable by wireless terminal 201 when wireless terminal 201 is at the location, from all transmitters (e.g., base stations 202-1 through 202-3, commercial television, commercial radio, navigation, ground-based aviation, etc.), as a function of the calendrical time, T, and the environmental conditions, N; and ii. the predicted pathloss of all of the signals transmitted by wireless terminal 201 when wireless terminal 201 is in the location as receivable at base stations 202-1 through 202-3, as a function of the calendrical time, T, and the environmental conditions, N; and iii. the predicted received signal strength of all of the signals transmitted by wireless terminal 201 when wireless terminal 201 is in the location as receivable at base stations 202-1 through 202-3, as a function of the calendrical time, T, and the environmental conditions, N; and iv. the predicted received signal-to-impairment ratio (e.g., Eb/No, etc.) of all of the signals receivable by wireless terminal 201 when wireless terminal 201 is in the location, from all transmitters, as a function of the calendrical time, T, and the environmental conditions, N; and v. the predicted received signal-to-impairment ratio of all of the signals transmitted by wireless terminal 201 when wireless terminal 201 is in the location as receivable at base stations 202-1 through 202-3, as a function of the calendrical time, T, and the environmental conditions, N; and vi. the predicted received temporal difference of each pair of multipath components (e.g., one temporal difference for one pair of multipath components, a pair of temporal differences for a triplet of multipath components, etc.) of all of the signals receivable by wireless terminal 201 when wireless terminal 201 is in the location, from all transmitters, as a function of the calendrical time, T, and the environmental conditions, N; and vii. the predicted received temporal difference of each pair of multipath components (e.g., one temporal difference for one pair of multipath components, a pair of temporal differences for a triplet of multipath components, etc.) of all of the signals transmitted by wireless terminal 201 when wireless terminal 201 is in the location as receivable at base stations 202-1 through 202-3, as a function of the calendrical time, T, and the environmental conditions, N; and viii. the predicted received delay spread (e.g., RMS delay spread, excess delay spread, mean excess delay spread, etc.) of all of the signals receivable by wireless terminal 201 when wireless terminal 201 is in the location, from all transmitters, as a function of the calendrical time, T, and the environmental conditions, N; and ix. the predicted received delay spread (e.g., RMS delay spread, excess delay spread, mean excess delay spread, etc.) of all of the signals transmitted by wireless terminal 201 when wireless terminal 201 is in the location as receivable at base stations 202-1 through 202-3, as a function of the calendrical time, T, and the environmental conditions, N; and x. the predicted received relative arrival times of two or more multipath components of all of the signals receivable by wireless terminal 201 when wireless terminal 201 is in the location, from all transmitters (which can be determined by a rake receiver in well-known fashion), as a function of the calendrical time, T, and the environmental conditions, N; and xi. the predicted received relative arrival times of two or more multipath components of all of the signals transmitted by wireless terminal 201 when wireless terminal 201 is in the location as receivable at base stations 202-1 through 202-3, as a function of the calendrical time, T, and the environmental conditions, N; and xii. the predicted round-trip time of all of the signals transmitted and receivable by wireless terminal 201 through base stations 202-1, 202-2, and 202-3, as a function of the calendrical time, T, and the environmental conditions, N; and xiii. the predicted round-trip time of all of the signals transmitted and receivable by base stations 202-1, 202-2, and 202-3 through wireless terminal 201, as a function of the calendrical time, T, and the environmental conditions, N; and xiv. the identity of the base stations that provide telecommunications service to the location, as a function of the calendrical time, T, and the environmental conditions, N; and xv. the identities of the neighboring base stations that provide telecommunications service to the location, as a function of the calendrical time, T, and the environmental conditions, N; and xvi. the handover state (e.g., soft, softer, 1×, 2×, etc.) of wireless terminal 201 and wireless telecommunication system 200 when wireless terminal 201 is in the location as a function of the calendrical time, T, and the environmental conditions, N.

Operation of the Illustrative Embodiment

Figure 6:
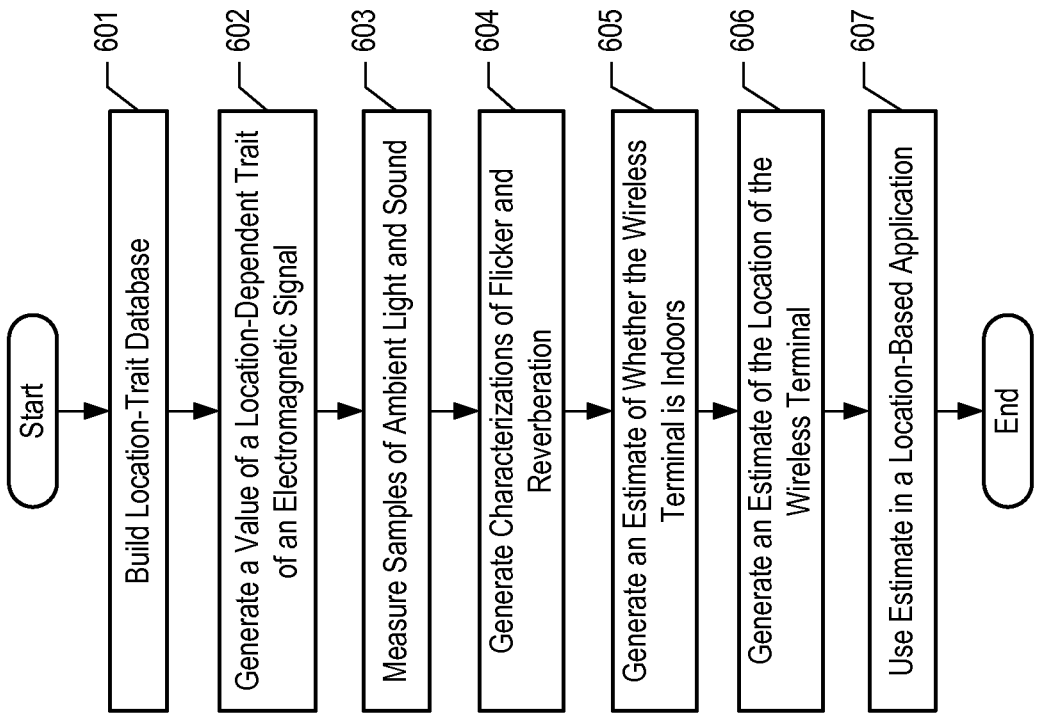
FIG. 6 depicts a flowchart of the salient processes performed in accordance with the illustrative embodiment of the present invention.

FIG. 6 depicts a flowchart of the salient processes performed in accordance with the illustrative embodiment of the present invention. The details of the illustrative location estimation technique that are not described herein are described in U.S. Pat. No. 7,257,414, which is incorporated herein by reference.

The processes performed by wireless telecommunications system 200 of the illustrative embodiment are depicted in the drawings (i.e., FIG. 6 and subsequent figures) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

In accordance with process 601, a location-trait database is built. For the purposes of this specification, the "Location-Trait Database" is defined as a database of maps (e.g., those that are described above and in FIG. 5, etc.) that associate each of a plurality of locations to one or more predicted traits associated with a wireless terminal at that location. The details of building a location-trait database are described below and in FIG. 7.

In accordance with process 602, values are generated of a location-dependent trait of an electromagnetic signal processed through an antenna of wireless terminal 201—that is, an electromagnetic signal that is received by terminal 201 through its antenna or transmitted by terminal 201 through its antenna. The details of process 602 are described below and in FIG. 8.

In accordance with process 603, wireless terminal 201 measures a sample of the light and a sample of the sound in its vicinity. The details of process 603 are described below and in FIG. 9.

In accordance with process 604, a characterization of flicker and a characterization of reverberation in the vicinity of wireless terminal 201 are generated. The details of process 604 are described below and in FIG. 10.

In accordance with process 605, an estimate of the probability that wireless terminal 201 is indoors is generated. The details of process 605 are described below and in FIG. 11.

In accordance with process 606, an estimate of the location of wireless terminal 201 is generated, based on i) the estimate of the probability that wireless terminal 201 is indoors that is generated in accordance with process 605, and ii) one or more values of the location-dependent trait that are generated in accordance with process 602. The details of process 606 are described below and in FIG. 12.

A location estimation technique that utilizes location-dependent traits is used in the illustrative embodiment. However, it will be clear to those skilled in the art, after reading this specification, how to make and use embodiments of the present invention in which i) the estimate of the probability that wireless terminal 201 is indoors is used in concert with ii) a location estimation technique that operates independently of location-dependent traits. Moreover, in some alternative embodiments, the estimation of whether wireless terminal 201 is indoors can be regarded as the resulting estimate of the location of the terminal, as those who are skilled in the art will appreciate after reading this specification.

In accordance with process 607, the estimate of the location of wireless terminal 201 is used in a location-based application, such as and without limitation, E 9-1-1 service. In support of this, the estimate is transmitted to the location-based application.

Building Location-Trait Database 313

Figure 7:
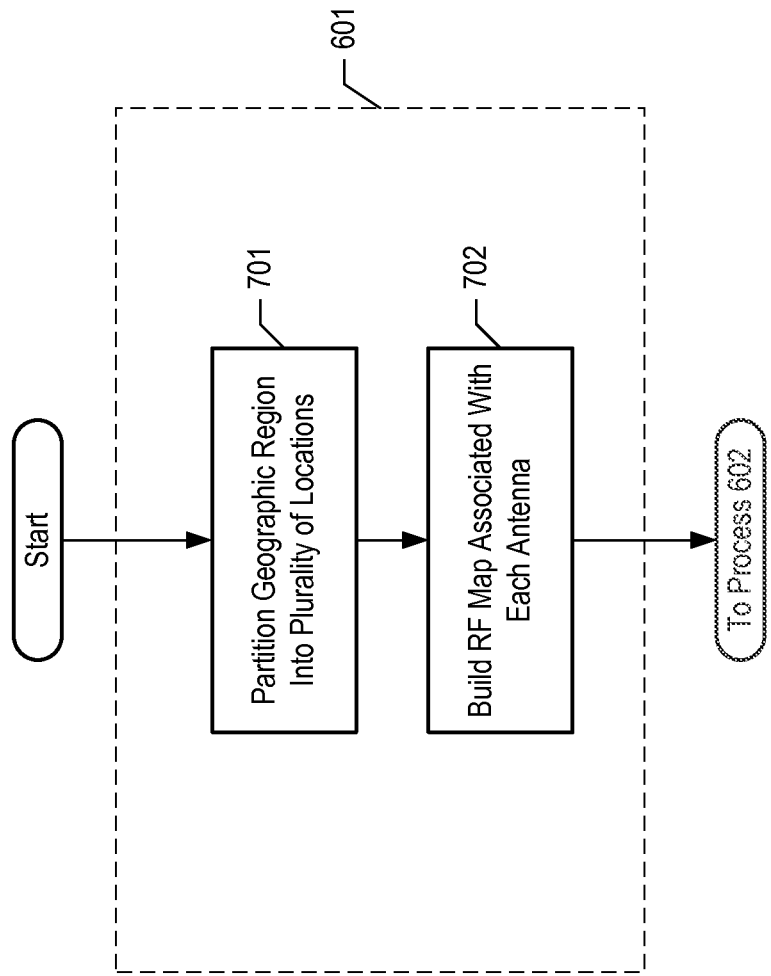
FIG. 7 depicts a flowchart of the salient processes performed in accordance with process 601.

FIG. 7 depicts a flowchart of the salient processes performed in accordance with process 601—building the Location-Trait Database.

In accordance with the illustrative embodiment, location-trait database 413 is prepared for and stored at location server 213, as it is location server 213 that generates an estimate of the location of wireless terminal 201, in accordance with process 606. In some embodiments of the present invention, however, location-trait database 313 is prepared and stored at wireless terminal 201, instead of or in addition to database 413.

In accordance with process 701, geographic region 220 is partitioned into B(T,N) locations, such as the 24 locations depicted in FIG. 5, wherein B(T,N) is a positive integer greater than one, and wherein B(T,N) varies as a function of calendrical time T and the environmental conditions N. It will be clear to those skilled in the art, after reading this disclosure, how to make and use alternative embodiments of the present invention in which the number of locations that geographic region 220 is partitioned into is static. Furthermore, it will be clear to those skilled in the art, after reading this disclosure, how to make and use alternative embodiments of the present invention in which the number of locations that geographic region 220 is partitioned into is not dependent on the calendrical time T or the environmental conditions N.

Some traits of the radio frequency spectrum and of individual signals are different at different locations in geographic region 220. Similarly, some traits of the radio frequency spectrum and of individual signals transmitted by wireless terminal 201 change at base stations 202-1, 202-2, and 202-3 when wireless terminal 201 is at different locations. Furthermore, some traits (e.g., hand-off state, etc.) of wireless telecommunications system 200 change when wireless terminal 201 is at different locations.

Each location is described by:
i. a unique identifier b,
ii. its dimensionality (e.g., zero-dimension, one-dimension, two dimensions, three dimensions, etc.),
iii. the coordinates (e.g., latitude, longitude, altitude, etc.) that define its scope (e.g., position, area, volume, etc.), which can be static or, alternatively, can vary as a function of calendrical time T or the environmental conditions N, or both the calendrical time T and the environmental conditions N,
iv. the predicted value E(b, T, N, W, Q) for each trait, Q, when wireless terminal W is at location b at calendrical time T given environmental conditions, N,
v. whether it is indoors or outdoors, and
vi. the identities of its adjacent locations.

It will be clear to those skilled in the art, after reading this disclosure, how to make and use alternative embodiments of the present invention that partition geographic region 220 into any number of locations of any size, shape, and arrangement. Furthermore, it will be clear to those skilled in the art, after reading this disclosure, how to make and use embodiments of the present invention in which the locations are identical in size and shape.

In accordance with process 702, the predicted values E(b, T, N, W, Q) for the location-dependent traits are associated with each location, as described above and in FIG. 5.

In accordance with the illustrative embodiment of the present invention, all signals transmitted by wireless terminal 201 are for communicating with base stations 202-1 through 202-3, and all of the signals received by wireless terminal 201 are:
i. signals transmitted by base stations 202-1 through 202-3 for communicating with wireless terminal 201,
ii. television signals,
iii. radio signals,
iv. aviation signals, and
v. navigation signals.

It will be clear to those skilled in the art, after reading this disclosure, how to make and use alternative embodiments of the present invention that use different signals.

In accordance with the illustrative embodiment, the predicted values of these traits are determined through a combination of:
i. a plurality of theoretical and empirical radio-frequency propagation models, and
ii. a plurality of empirical measurements of the traits within geographic region 220, in well-known fashion.

Generating a Value of a Location-Dependent Trait

Figure 8:
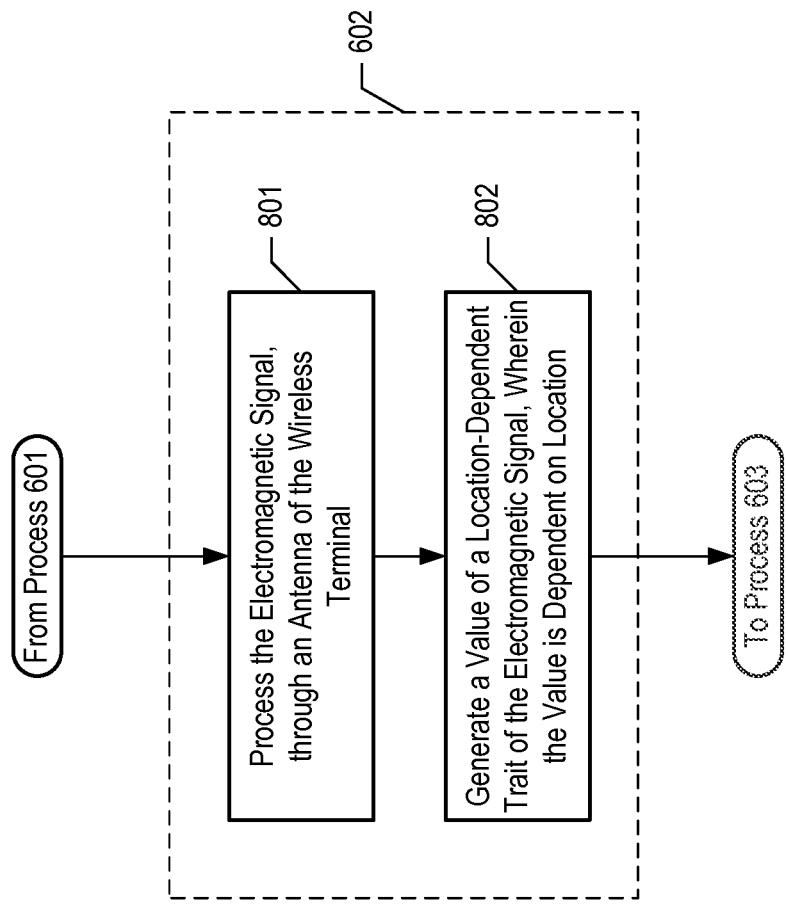
FIG. 8 depicts a flowchart of the salient processes performed in process 602.

FIG. 8 depicts a flowchart of the salient processes performed in process 602—processing an electromagnetic signal and generating a value of a location-dependent trait of the electromagnetic signal.

In accordance with process 801, wireless terminal 201 processes an electromagnetic signal through its antenna. In some embodiments of the present invention, processing the electromagnetic signal corresponds to wireless terminal 201 receiving the signal through its antenna. In some other embodiments, processing the electromagnetic signal corresponds to wireless terminal 201 transmitting the signal through its antenna, which signal can be received by at least one of base stations 202-1 through 202-3, in well-known fashion.

In accordance with process 802, wireless terminal 201 generates one or more values of a location-dependent trait of the electromagnetic signal received or transmitted in accordance with process 801. In accordance with the illustrative embodiment, wireless terminal 201 generates values by making empirical measurements of location-dependent traits that depend on the location of the terminal. Wireless terminal 201 makes Y non-empty sets of measurements of the traits associated with itself. Each set of measurements is made at one of instants $H_1$ through $H_Y$. Terminal 201 transmits these values it generates to location server 213, in some embodiments. The measurements made at instants $H_1$ through $H_Y$ are used as part of a time-series analysis for estimating the location of terminal 201, as described in detail below and with respect to process 1203.

In some embodiments of the present invention, the value of a location-dependent trait is generated by one or more of base stations 202-1 through 202-3 making measurements of an electromagnetic signal transmitted by wireless terminal 201 and then making available the measurements for subsequent processing.

In accordance with the illustrative embodiment, it is wireless terminal 201 that generates the value of the location-dependent trait (e.g., by measuring a received electromagnetic signal, etc.). In some embodiments of the present invention, it is a different device, such as one or more of base stations 202-1 through 202-3 or location server 213, that generates the value of the location-dependent trait—for example, based on making measurements of an electromagnetic signal received from wireless terminal 201.

Measuring Samples of Light and Sound

Figure 9:
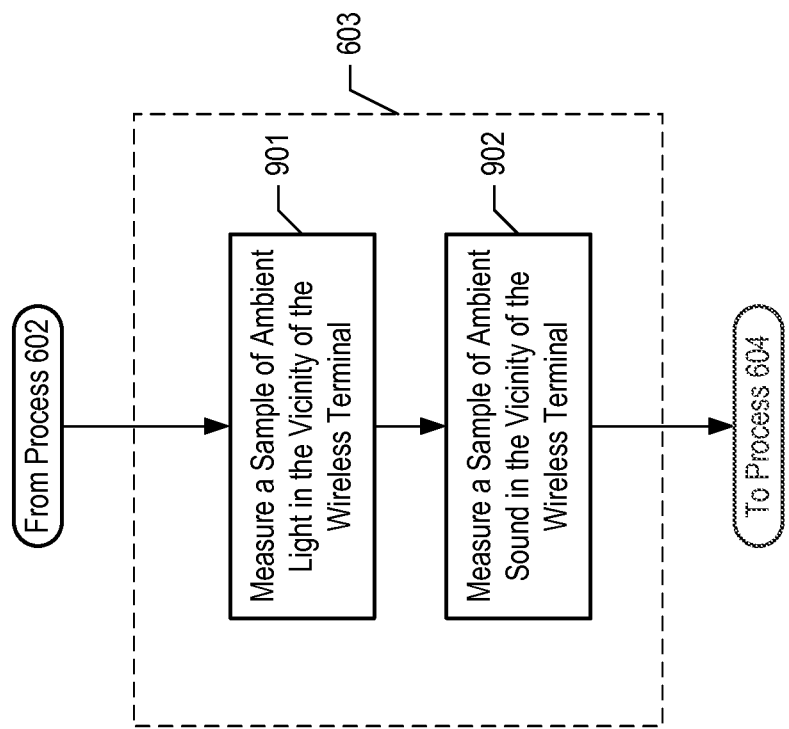
FIG. 9 depicts a flowchart of the salient processes performed in process 603.

FIG. 9 depicts a flowchart of the salient processes performed in process 603—measuring a sample of light and a sample of sound in the vicinity of wireless terminal 201.

In accordance with process 901, wireless terminal 201 measures a sample of light in the vicinity of the terminal. To measure the sample, terminal 201 utilizes light detector 304 in well-known fashion.

In accordance with the illustrative embodiment, the sample of light is measured whenever a location estimate is required. In some embodiments of the present invention, the sample of light is measured whenever another function at terminal 201 uses light detector 304, such as the terminal's camera function being used by the terminal's user, and then is stored for eventual use in the location estimation technique of the illustrative embodiment.

In accordance with process 902, wireless terminal 201 measures a sample of sound in the vicinity of the terminal. To measure the sample, terminal 201 utilizes microphone 305 in well-known fashion.

In accordance with the illustrative embodiment, the sample of sound is measured whenever a location estimate is required. In some embodiments of the present invention, the sample of sound is measured whenever another function at terminal 201 uses microphone 305, such as a voice call being made by the terminal's user, and then is stored for eventual use in the location estimation technique of the illustrative embodiment.

Wireless terminal 201, in some embodiments of the present invention, generates a sound and transmits it through speaker 306, and then measures the reverberation present based on the sound that is being transmitted.

In some alternative embodiments of the present invention, wireless terminal 201 measures the sample of light, but not the sample of sound. In some other alternative embodiments, wireless terminal 201 measures the sample of sound, but not the sample of light.

Generating Characterizations of Flicker and Reverberation

Figure 10:
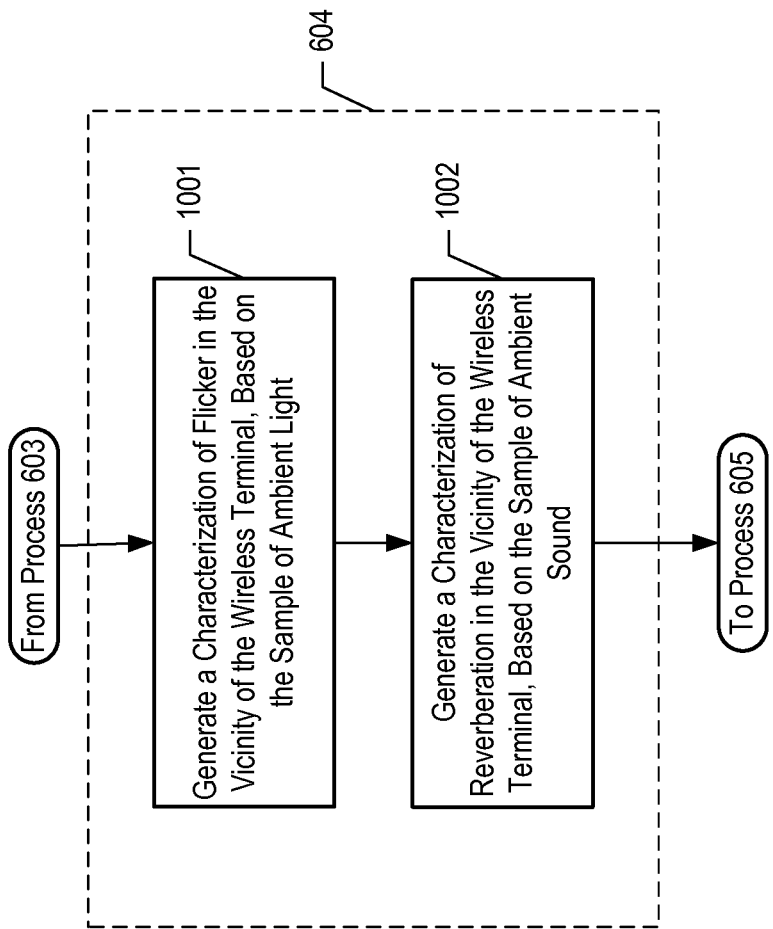
FIG. 10 depicts a flowchart of the salient processes performed in process 604.

FIG. 10 depicts a flowchart of the salient processes performed in process 604—generating a characterization of flicker and a characterization of reverberation in the vicinity of wireless terminal 201.

In accordance with process 1001, wireless terminal 201 generates a characterization of flicker in the vicinity of the terminal, based on the measured sample of light in the vicinity of the terminal. In accordance with the illustrative embodiment, the characterization that is generated identifies whether flicker is detected or not. Algorithms for the detection of flicker are well known in the art.

In some embodiments of the present invention, the characterization of flicker is for power-line flicker—for example, the flicker that is present in the light emitted by light sources operating off of alternating-current (AC) power. In some embodiments, the characterization of flicker is for flicker with a frequency between 99 Hz and 121 Hz—for example, flicker at 100 Hz or 120 Hz that results from a AC power source having a frequency of 50 Hz or 60 Hz, respectively.

In accordance with process 1002, wireless terminal 201 generates a characterization of reverberation in the vicinity of the terminal, based on the measured sample of sound in the vicinity of the terminal. In accordance with the illustrative embodiment, the characterization that is generated identifies whether reverberation is detected or not. Algorithms for the detection of reverberation are well known in the art.

Wireless terminal 201, in some alternative embodiments, generates the characterization of flicker, but not the characterization of reverberation. In some other alternative embodiments, wireless terminal 201 generates the characterization of reverberation, but not the characterization of flicker.

In accordance with the illustrative embodiment, it is wireless terminal 201 that generates the characterizations of flicker and reverberation. In some embodiments of the present invention, it is location server 213 that generates the characterization of flicker or the characterization of reverberation, or both, instead of or in addition to terminal 201. In those embodiments, wireless terminal 201 transmits the sample of light measured in process 901, or the sample of sound measured in process 902, or both, to location server 213. In those embodiments, location server 213 receives the transmitted sample or samples, and generates one or both of the characterizations of flicker and sound in the manner described above and with respect to processes 1001 and 1002.

Figure 11:
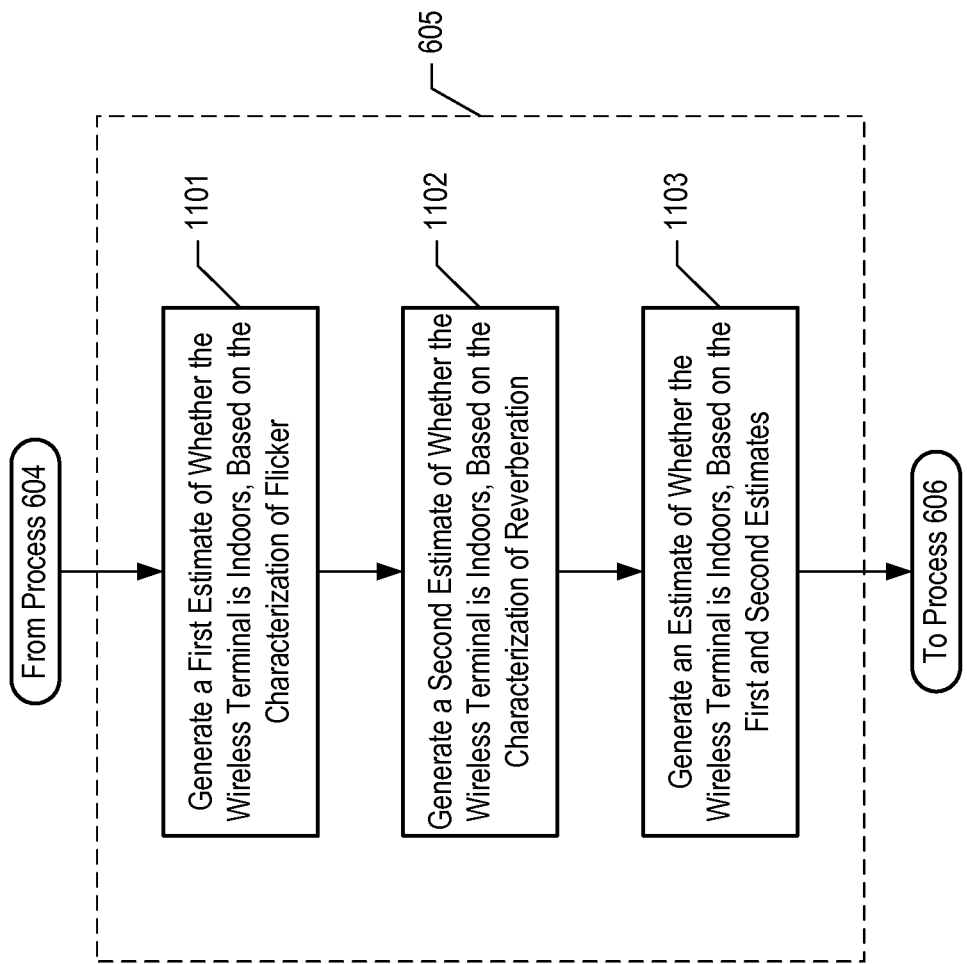
FIG. 11 depicts a flowchart of the salient processes performed in process 605.

Generating an Estimate of the Probability that Wireless Terminal 201 is Indoors FIG. 11 depicts a flowchart of the salient processes performed in process 605—generating an estimate of the probability that wireless terminal 201 is indoors.

In accordance with process 1101, wireless terminal 201 generates a first intermediate estimate of the probability that it is indoors, based on the characterization of flicker generated in process 1001. In accordance with the illustrative embodiment, terminal 201 estimates that it is indoors if the characterization of flicker indicates that flicker is detected. In some embodiments of the present invention, terminal 201 estimates that it is outdoors if the characterization of flicker indicates that no flicker is detected. As those who are skilled in the art will appreciate, after reading this specification, other criteria can be applied to the characterization of flicker, in order to estimate that terminal 201 is indoors or that terminal 201 is outdoors.

In accordance with process 1102, wireless terminal 201 generates a second intermediate estimate of the probability that it is indoors, based on the characterization of reverberation generated at process 1002. In accordance with the illustrative embodiment, terminal 201 estimates that it is indoors if the characterization of reverberation indicates that reverberation is detected. In some embodiments of the present invention, terminal 201 estimates that it is outdoors if the characterization of reverberation indicates that no reverberation is detected. As those who are skilled in the art will appreciate, after reading this specification, other criteria can be applied to the characterization of reverberation, in order to estimate that terminal 201 is indoors or that terminal 201 is outdoors.

In accordance with process 1103, wireless terminal 201 generates an overall estimate of the probability that it is indoors, based on the first and second estimates generated in processes 1101 and 1102, respectively. In accordance with the illustrative embodiment, terminal 201 estimates that it is indoors if at least one of the first estimate and the second estimate indicates that terminal 201 is indoors. In other embodiments of the present invention, other criteria can be applied such as, while not being limited to, the following:

i. estimating terminal 201 to be indoors only when both the first and second estimate indicate that the terminal is indoors,
 ii. estimating terminal 201 to be outdoors if at least one of the first and second estimate indicates that the terminal is outdoors,
 iii. estimating terminal 201 to be outdoors only when both the first and second estimate indicate that the terminal is outdoors.

As those who are skilled in the art will appreciate, after reading this specification, other criteria can be applied, in order to estimate comprehensively that terminal 201 is indoors or that terminal 201 is outdoors.

In some embodiments of the present invention, wireless terminal 201 generates the estimate of the probability that wireless terminal 201 is indoors based also on an estimate of the amount of sunshine in the region of the wireless terminal. For example, flicker can be present outdoors under conditions of reduced sunshine, such as on a cloudy day or during twilight hours, or when no sunshine is present such as at night. The light emitted by streetlights and other artificial lighting under these conditions can cause flicker to be present in the vicinity of the terminal. Under conditions of reduced sunshine or no sunshine, terminal 201 would de-emphasize the characterization of flicker or ignore it entirely, in some embodiments.

As those who are skilled in the art will appreciate, after reading this specification, wireless terminal 201 is capable of estimating, or receiving an estimate of, the amount of sunshine in various ways. For example and without limitation, the estimate can be based on the terminal's clock (i.e., to determine whether it is day or night), a weather report (i.e., to determine cloud cover), and so on.

Wireless terminal 201, in some alternative embodiments, generates the estimate based on the characterization of flicker, but not on the characterization of reverberation. In some other alternative embodiments, wireless terminal 201 generates the estimate based on the characterization of reverberation, but not on the characterization of flicker.

In accordance with the illustrative embodiment, it is wireless terminal 201 that generates the estimate of the probability that it is indoors. In some embodiments of the present invention, it is location server 213 that generates the estimate of the probability that wireless terminal 201 is indoors, instead of or in addition to terminal 201. In some of those embodiments, wireless terminal 201 transmits the characterization of flicker generated in process 1001, or the characterization of reverberation generated in process 1002, or both, to location server 213. In those embodiments, location server 213 receives the transmitted characterization or characterizations, and generates the estimate of the probability that wireless terminal 201 is indoors, in the manner described above and with respect to processes 1101 through 1103, with or without using an estimate of the amount of sunshine.

As those who are skilled in the art will further appreciate after reading this specification, as an alternative to the foregoing scenario, location server 213 can both generate and utilize the characterization of flicker or of reverberation, or both, in generating the estimate of the probability that wireless terminal 201 is indoors.

Generating an Estimate of the Location of Wireless Terminal 201

Figure 12:
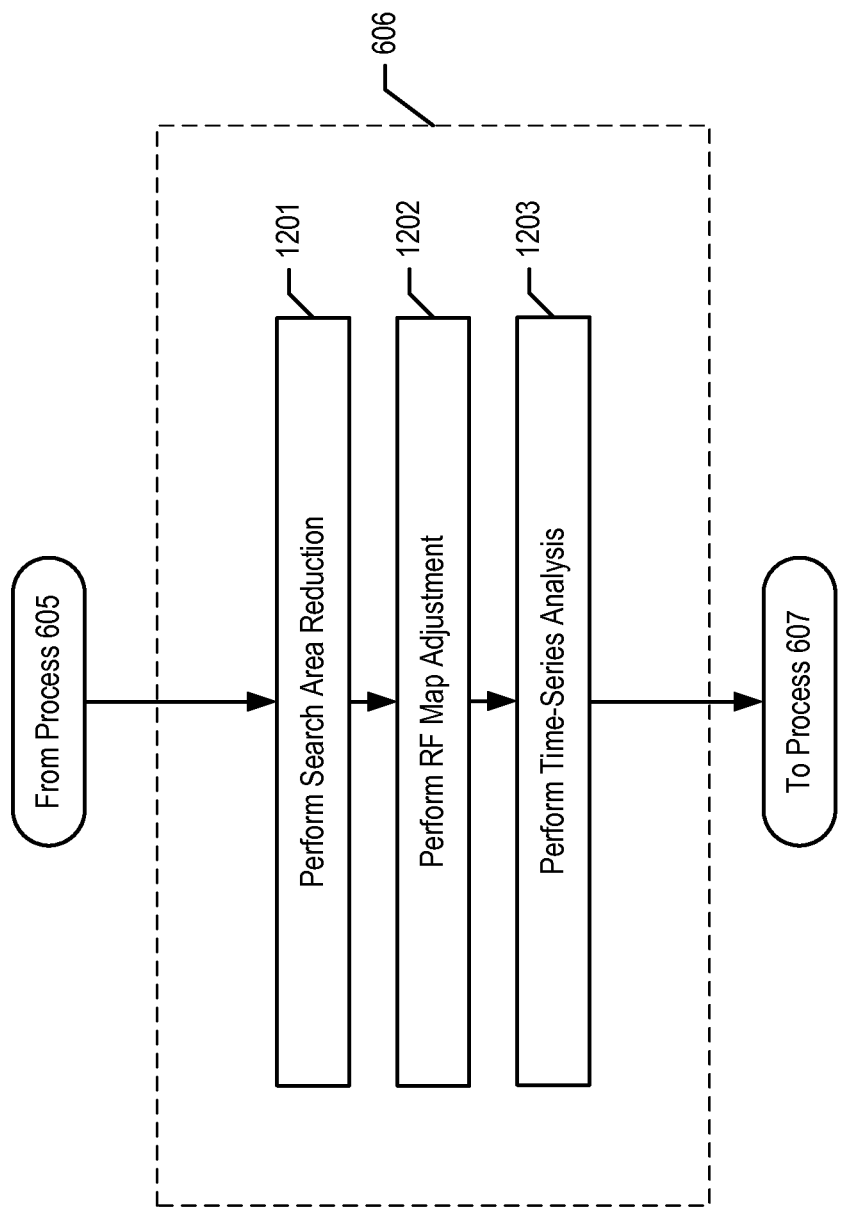
FIG. 12 depicts a flowchart of the salient processes performed in process 606.

FIG. 12 depicts a flowchart of the salient processes performed in process 606—generating an estimate of the location of wireless terminal 201. In accordance with the illustrative embodiment, process 606 is initiated by a request from location client 212 for the location of wireless terminal 201. It will be clear to those skilled in the art, however, after reading this disclosure, how to make and use alternative embodiments of the present invention in which process 606 is initiated periodically, sporadically, or in response to some other event. Moreover, it will be clear to those skilled in the art, after reading this disclosure, how to make and use alternative embodiments of the present invention in which process 606 is initiated at some other device other than location client 212, such as wireless terminal 201. For example and without limitation, the user of terminal 201 might be using a location-based application that triggers a request for the location of the terminal.

In accordance with the illustrative embodiment, it is location server 213 that generates the estimate of the location of wireless terminal 201. In some embodiments of the present invention, it is wireless terminal 201 that generates the estimate of its location in accordance with process 606, instead of or in addition to server 213 generating the estimate. In those embodiments, wireless terminal 201 utilizes location-trait database 313, along with the values of the location-dependent traits that it generates and the estimate that it generates of whether the terminal is indoors.

As an overview, Y probability distributions for the location of wireless terminal 201 are generated for each of instants $H_1$ through $H_Y$ in the temporal interval $\Delta T$, wherein Y is a positive integer, based on comparing the measurements of traits associated with wireless terminal 201 (i.e., the values generated in process 602) at each of instants $H_1$ through $H_Y$, to predicted values for those traits at those times. Each of the Y probability distributions provides a first estimate of the probability that wireless terminal 201 is in each location at each of instants $H_1$ through $H_Y$. This handling of the probability distributions is described below and in process 1203.

In accordance with process 1201, location server 213 performs a technique called "search area reduction" in preparation for process 1203. To understand what search area reduction is and why it is advantageous, a brief discussion of process 1203 is helpful. In process 1203, location server 213 performs a time-series analysis in order to estimate the probability that wireless terminal 201 is in each location at each of instants $H_1$ through $H_Y$. This requires generating Y multi-dimensional probability distributions, one for each of instants $H_1$ through $H_Y$.

The process for generating each multi-dimensional probability distribution can be computationally intensive and the intensity depends on the number of locations that must be considered as possible locations for wireless terminal 201. When the number of locations that must be considered is small, the process can be performed quickly enough for many "real-time" applications. In contrast, when the number of locations that must be considered is large, the process can often take too long.

Nominally, all of the locations in geographic region 220 must be considered because, prior to process 1201, wireless terminal 201 could be in any location out of possibly thousands, millions, or billions of locations. The consideration of thousands, millions, or billions of locations for each instant by location server 213 might take too long for many real-time applications.

Therefore, to expedite the performance of process 1203, location server 213 performs one or more computationally-efficient tests that quickly and summarily eliminate many possible locations for wireless terminal 201 from consideration, and, therefore, summarily set to zero the probability that wireless terminal 201 is at those locations. This reduces the number of locations that must be fully considered in process 1203 and generally improves the speed with which process 606 is performed.

Figure 13:
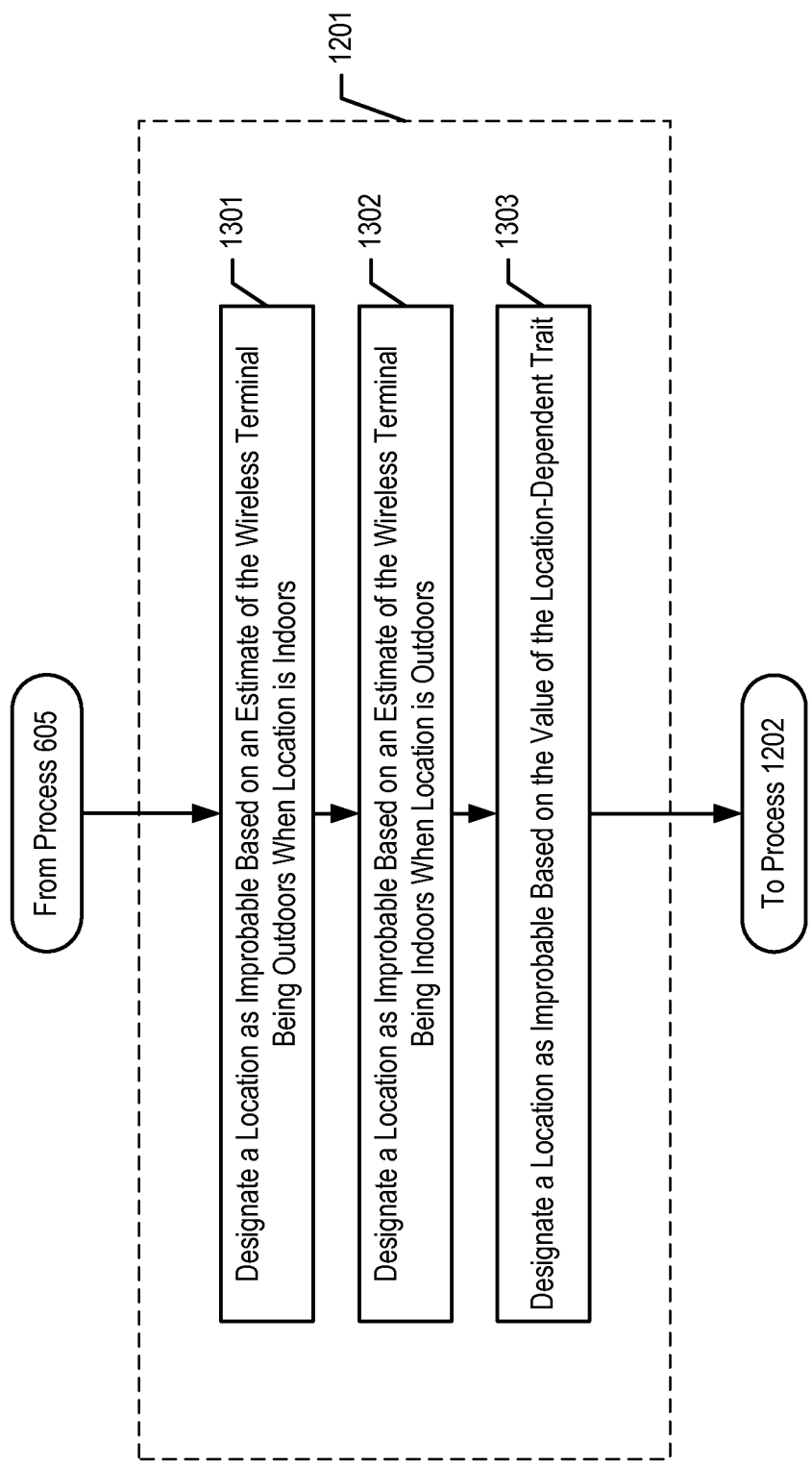
FIG. 13 depicts a flowchart of the salient processes performed in accordance with process 1201.

FIG. 13 depicts a flowchart of the salient processes performed in accordance with process 1201—search area reduction. In some embodiments of the present invention, location server 213 uses additional techniques to those described below, in order to perform search area reduction.

In accordance with process 1301, location server 213 designates a location as improbable based an estimate of wireless terminal 201 being outdoors when the location known to be indoors. The theory underlying this test is when the terminal is estimated to be outdoors, any indoor location is considered to be invalid. Although it is possible that the estimate of the wireless terminal being outdoors might be wrong, the possibility of this occurring can be minimized by selecting the proper criteria for generating the estimate in process 605.

In accordance with process 1302, location server 213 designates a location as improbable based on an estimate of wireless terminal 201 being indoors when the location is known to be outdoors. The theory underlying this test is when the terminal is estimated to be indoors, any outdoor location is considered to be invalid. Although it is possible that the estimate of the wireless terminal being indoors might be wrong, the possibility of this occurring can be minimized by selecting the proper criteria for generating the estimate in process 605.

As discussed below and in FIG. 9, in some embodiments, portions of a particular location might be indoors while other portions of the location might be outdoors, instead of a particular location being either all indoors or all outdoors. In those embodiments, processes 1301 and 1302 can be ignored or each location in the location-trait database generated in FIG. 7 can be subdivided for the purpose of tracking the indoor portions and outdoor portions of each location.

In accordance with process 1303, location server 213 designates a location as improbable based on the value of the location-dependent trait generated in process 602. Various tests for designating a location as improbable and that are based on the value of the location-dependent trait are described in U.S. Pat. No. 7,257,414, which is incorporated herein by reference.

A location that that is designated as improbable at instant $H_i$ by one or more of the foregoing processes is designated as improbable by process 1201 at instant $H_i$.

Figure 14:
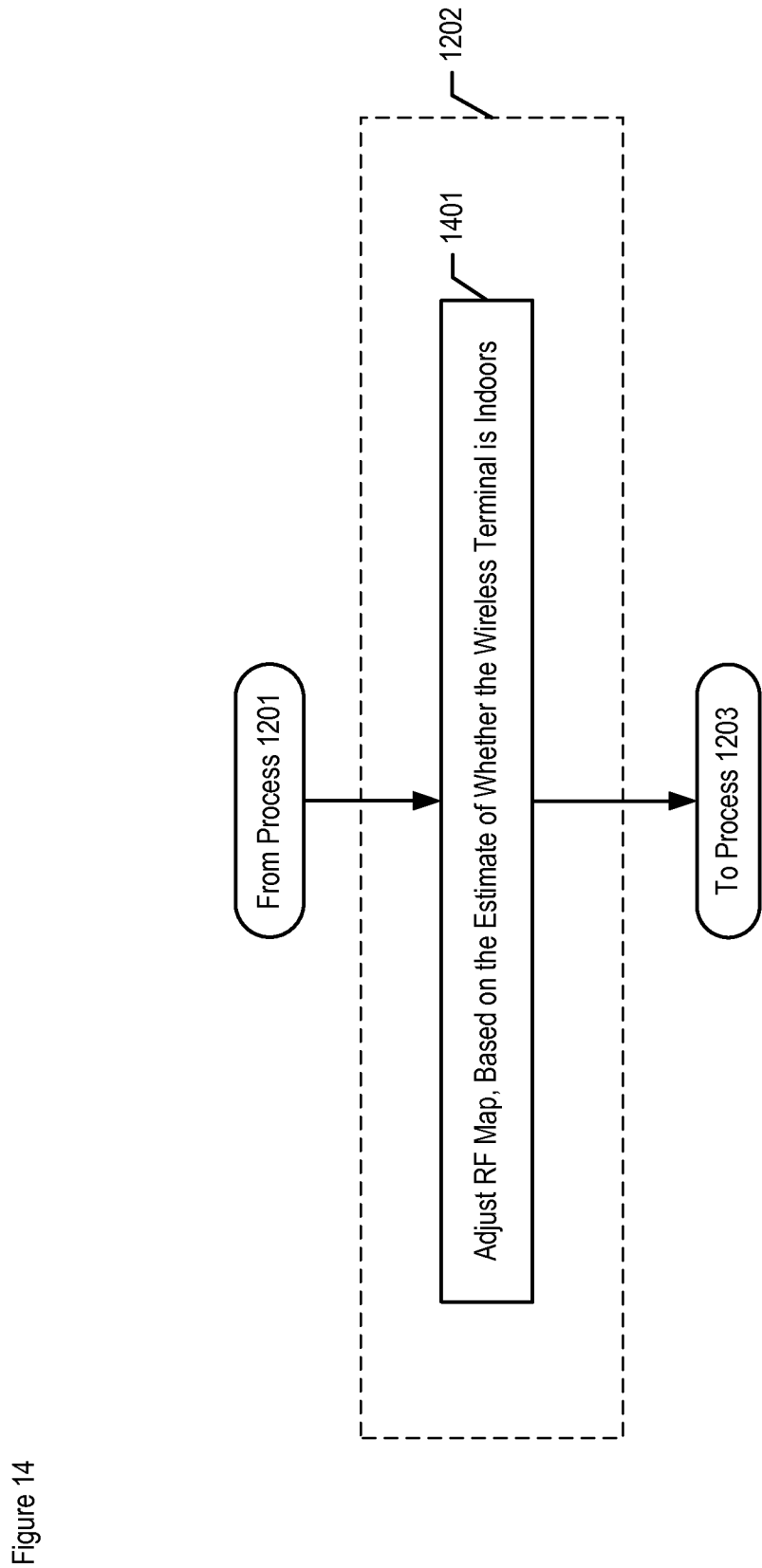
FIG. 14 depicts a flowchart of the salient processes performed in accordance with process 1202.

FIG. 14 depicts a flowchart of the salient processes performed in accordance with process 1202—map adjustment. In accordance with process 1202, location server 213 adjusts an RF map in preparation for process 1203, wherein the map is described above and in FIG. 5. In particular, server 213 adjusts the map that associates: i) a plurality of possible locations of wireless terminal 201 with ii) a predicted value of the location-dependent trait associated with each of the plurality of possible locations of the wireless terminal. The map correlates each of a plurality of locations to one or more predicted traits associated with a wireless terminal at that location. As described in FIG. 5, the maps are stored as part of Location-Trait Database 413 at location server 213.

In accordance with process 1401, location server 213 adjusts the relevant map stored in Location-Trait Database 413, based on the estimate of the probability that wireless terminal 201 is indoors that is generated in process 605.

The theory underlying this adjustment is explained here. As described above, the map correlates each of a plurality of locations to one or more predicted traits associated with a wireless terminal at that location. Each location represented in the map, however, might comprise one or more portions that are indoors and one or more portions that are outdoors. Additionally, the predicted value of each location-dependent trait stored for that location might be representative of the indoor portions or of the outdoor portions, but not necessary of both. Therefore, the predicted values of one or more location-dependent traits for the location may have to be adjusted accordingly, based on whether wireless terminal is estimated to be indoors or outdoors. For example, the predicted signal strength for a particular location might be too high for an indoor portion of the location or too low for an outdoor portion of a location, or both; consequently, the predicted signal strength would have to be adjusted accordingly.

In accordance with process 1203, location server 213 performs time-series analysis by generating each of the Y probability distributions for wireless terminal 201 at each of instants $H_1$ through $H_Y$. In doing so, server 213 estimates the location of wireless terminal 201 based on i) values that it receives of the location-dependent traits generated in process 602, ii) one or more possible locations of wireless terminal 201 not designated as improbable in process 1201, and iii) an RF map adjusted as needed in process 1202.

Location server 213 first sets the probability of wireless terminal 201 being at a location at instant $H_i$ to zero (0) if the location was designated as improbable at instant $H_i$ by process 1201.

Location server 213 then compares the received measures of the location-dependent trait to the predicted values for that trait associated with one or more possible locations of wireless terminal 201 not designated as improbable.

In accordance with the illustrative embodiment, server 213 performs this comparison by generating the Euclidean norm between the measurements of a trait and the predicted values for that trait at all instants and for all locations not designated as improbable by process 1201. To accomplish this, the Euclidean norm is generated between the measurements of the predicted values for those traits in Location-Trait Database 313 and specified in the map adjusted by process 1202. To accomplish this, the Euclidean norm is generated as described in Equation 1:

$$V(b,H_i) = \sqrt{\Sigma((E(b,H_i,N,W,Q) - M(b,H_i,N,W,Q)) \cdot \omega(Q))^2} \quad \text{(Eq. 1)}$$

wherein $V(b,H_i)$ is the Euclidean norm for Location b at instant $H_i$ based on the square root of the sum of the square of the differences between each (corrected and differential, where appropriate) trait measurement $M(b, H_i, N, W, Q)$ minus the predicted value $E(b, H_i, N, W, Q)$ for that trait, where $\omega(Q)$ is a weighting factor that indicates the relative weight to be given discrepancies in one trait versus discrepancies in the other traits.

Location server 213 generates the un-normalized probabilities of the location of wireless terminal 201 at each location, based on the Euclidean norms generated above, as shown in Equation 2.

$$UP(b, H_i) = e^{\left(\frac{-V^2(b,H_i)}{\delta^2}\right)} \quad \text{(Eq. 2)}$$

wherein $UP(b,H_i)$ represents the un-normalized probability that wireless terminal 201 is in Location b at instant $H_i$, and wherein $\delta^2$ equals:

$$\delta^2 = \delta_E^2 + \delta_M^2 \quad \text{(Eq. 3)}$$

wherein $\delta_E^2$ is the square of the uncertainty in the error in Location-Trait Database and $\delta_M^2$ is the square of the uncertainty in the calibrated measurements. It will be clear to those skilled in the art, after reading this disclosure, how to generate $\delta^2$.

Location server 213 normalizes the probabilities generated above, as described in Equation 4.

$$NP(b, H_i) = \frac{UP(b, H_i)}{\Sigma UP(b, H_i)} \quad \text{(Eq. 4)}$$

wherein $NP(b,H_i)$ represents the normalized probability that wireless terminal 201 is in Location b.

Location server 213 generates an estimate of the location of wireless terminal 201 at instant $H_1$ based on the maximum likelihood function of the normalized probability distribution at instant $H_1$.

MARKMAN DEFINITIONS

Based on—For the purposes of this specification, the phrase "based on" is defined as "being dependent on" in contrast to "being independent of". Being "based on" includes both functions and relations.

Characterization of Flicker—For the purposes of this specification, "characterization of flicker" is defined as a description of:
 i. one or more qualities of flicker, or
 ii. one or more parameters of flicker, or
 iii. both i and ii.
A characterization of flicker specifically includes a description that flicker is absent.

Characterization of Reverberation—For the purposes of this specification, "characterization of reverberation" is defined as a description of:

i. one or more qualities of reverberation, or
ii. one or more parameters of reverberation, or
iii. both i and ii.

A characterization of reverberation specifically includes a description that reverberation is absent.

Estimate of the probability that the wireless Terminal is Indoors—For the purposes of this specification, an "estimate of the probability that the wireless terminal is indoors" is defined as the complement of an estimate of the probability that the wireless terminal is outdoors (i.e., P(indoors)=1−P(outdoors)).

Flicker—For the purposes of this specification, "flicker" is defined as periodic or sporadic variations in the brightness of light.

Indicative—For the purposes of this specification, "indicative" is defined as probative.

Indoors—For the purposes of this specification, "indoors" is defined as being within a man-made structure.

Light—For the purposes of this specification, "light" is defined to comprise:
i. infrared light, or
ii. visible light, or
iii. ultraviolet light, or
iv. any combination of i, ii, and iii.

Location—For the purposes of this specification, the term "location" is defined as a zero-dimensional point, a finite one-dimensional path segment, a finite two-dimensional surface area, or a finite three-dimensional volume.

Microphone—For the purposes of this specification, a "microphone" is defined as hardware or hardware and software that converts an acoustic vibration into an electric signal. The microphone described in the illustrative embodiment might have more limitations than a microphone in the claims.

Output device—For the purposes of this specification, an "output device" is defined as hardware or hardware and software that transmits a signal.

Power-Line Flicker—For the purposes of this specification, "power-line flicker" is defined as the change in brightness of a light source due to fluctuations in the light source's power supply.

Processor—For the purposes of this specification, a "processor" is defined as hardware or hardware and software that performs mathematical and/or logical operations. The processor described in the illustrative embodiment might have more limitations than a processor in the claims.

Radio—For the purposes of this specification, a "radio" is defined as hardware or hardware and software that is capable of telecommunications via an unguided (i.e., wireless) electromagnetic signal of frequency less than 600 GHz. The radio described in the illustrative embodiment might have more limitations than a radio in the claims.

Reverberation—for the purposes of this specification, "reverberation" is defined as the repeated reflection of sound waves.

Speaker—For the purposes of this specification, a "speaker" is defined as hardware or hardware and software that converts an electric signal into an acoustic vibration. The speaker described in the illustrative embodiment might have more limitations than a speaker in the claims.

Sound—For the purposes of this specification, "sound" is defined to comprise sound at any frequency.

To Exhibit—For the purposes of this specification, the infinitive "to exhibit" and its inflected forms (e.g., "exhibiting", "exhibits", etc.) is defined as "to manifest or make evident."

To Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

To Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

To Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, a "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device capable of operating in a wireless environment are examples of wireless terminals.

When—For the purposes of this specification, the word "when" is defined as "upon the occasion of."

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the probability that a wireless terminal is indoors, the method comprising:
   generating, by the wireless terminal and as a consequence of the wireless terminal's normal operation, sound;
   measuring, by the wireless terminal, a sample of sound in the vicinity of the wireless terminal, wherein at least a portion of the generated sound is the sound that is measured by the wireless terminal;
   generating, by the wireless terminal, a characterization of reverberation in the vicinity of the wireless terminal based on the sample of sound in the vicinity of the wireless terminal;
   measuring, by the wireless terminal, a sample of light in the vicinity of the wireless terminal;
   generating, by the wireless terminal, a characterization of flicker in the vicinity of the wireless terminal based on the sample of light in the vicinity of the wireless terminal; and
   generating, by the wireless terminal, an estimate of the probability that the wireless terminal is indoors based on:
   (i) the characterization of reverberation in the vicinity of the wireless terminal; and
   (ii) the characterization of flicker in the vicinity of the wireless terminal.

2. The method of claim 1 wherein generating a characterization of reverberation further comprises indicating a number and strength of reflections in the sample of sound.

3. The method of claim 1 wherein the generated sound is a ringtone that is generated when the wireless terminal receives a call.

4. A wireless terminal comprising:
   a sound detector for measuring a sample of sound in the vicinity of the wireless terminal, wherein the sample of sound is at least a portion of sound generated by the wireless terminal as a consequence of the wireless terminal's normal operation;
a light detector for measuring a sample of light in the vicinity of the wireless terminal;
a processor for generating:
(1) a characterization of reverberation in the vicinity of the wireless terminal based on the sample of sound;
(2) a characterization of flicker in the vicinity of the wireless terminal based on the sample of light; and
(2) an estimate of the probability that the wireless terminal is indoors based on:
(i) the characterization of reverberation and the characterization of flicker in the vicinity of the wireless terminal.

5. The wireless terminal of claim 4 wherein sound generated by the wireless terminal is generated when the wireless terminal receives a call.

6. A method of estimating the location of a wireless terminal, the method comprising:
processing, through an antenna of the wireless terminal, an electromagnetic signal;
generating, by at least one of the wireless terminal and a location server, a value of a location-dependent trait of the electromagnetic signal, wherein the value of the location-dependent trait is dependent on the location of the wireless terminal;
measuring, by the wireless terminal, a sample of sound in the vicinity of the wireless terminal;
measuring, by the wireless terminal, a sample of light in the vicinity of the wireless terminal;
generating, by at least one of the wireless terminal and the location server, a characterization of reverberation in the vicinity of the wireless terminal based on the sample of sound in the vicinity of the wireless terminal and a characterization of flicker in the vicinity of the wireless terminal based on the sample of light in the vicinity of the wireless terminal;
generating, by at least one of the wireless terminal and the location server, an estimate of the probability that the wireless terminal is indoors based on:
(1) the characterization of reverberation in the vicinity of the wireless terminal; and
(2) the characterization of flicker in the vicinity of the wireless terminal; and
generating, by at least one of the wireless terminal and the location server, an estimate of the location of the wireless terminal based on:
(1) the value of the location-dependent trait, and
(2) the estimate of the probability that the wireless terminal is indoors, wherein the estimate of the probability affects a manner in which the value of the location-dependent trait is processed to generate an estimate of the location of the wireless terminal.

7. A method of estimating the location of a wireless terminal, the method comprising:
receiving, by a location server, a value of a location-dependent trait of an electromagnetic signal, wherein the value of the location-dependent trait is dependent on the location of the wireless terminal;
receiving, by the location server, an estimate of the probability that the wireless terminal is indoors, wherein the estimate is based on a characterization of reverberation in the vicinity of the wireless terminal based on a sample of sound obtained in the vicinity of the wireless terminal and a characterization of flicker in the vicinity of the wireless terminal based on a sample of light obtained in the vicinity of the wireless terminal; and
generating, by the location server, an estimate of the location of the wireless terminal based on:
(1) the value of the location-dependent trait, and
(2) the estimate of the probability that the wireless terminal is indoors, wherein the estimate of the probability affects a manner in which the value of the location-dependent trait is processed to generate an estimate of the location of the wireless terminal.

8. The method of claim 7 wherein the sample of sound is at least a portion of sound generated by the wireless terminal as a consequence of the wireless terminal's normal operation.

9. The method of claim 8 wherein the sound generated by the wireless terminal is generated when the wireless terminal receives a call.

10. A method comprising:
receiving, by a location server, a value of a location-dependent trait of an electromagnetic signal, wherein the value of the location-dependent trait is dependent on the location of the wireless terminal;
receiving, by a location server, a characterization of reverberation and a characterization of flicker in the vicinity of the wireless terminal;
generating, by the location server, an estimate of the probability that the wireless terminal is indoors based on the characterization of reverberation and the characterization of flicker in the vicinity of the wireless terminal; and
generating, by the location server, an estimate of the location of the wireless terminal based on:
(1) the value of the location-dependent trait, and
(2) the estimate of the probability that the wireless terminal is indoors, wherein the estimate of the probability affects a manner in which the value of the location-dependent trait is processed to generate an estimate of the location of the wireless terminal.

11. The method of claim 10 wherein generating an estimate of the location of the wireless terminal further comprises:
generating an RF map that correlates each of a plurality of locations to the value of the predicted location-dependent trait associated with the wireless terminal at each such location; and
adjusting the RF map based on the estimate of the probability that the wireless terminal is indoors at least some of the locations.

12. A method comprising:
receiving, by a location server, a value of a location-dependent trait of an electromagnetic signal, wherein the value of the location-dependent trait is dependent on the location of the wireless terminal;
receiving, by the location server, a sample of sound in the vicinity of the wireless terminal, wherein the sample of sound is at least a portion of sound generated by the wireless terminal as a consequence of the wireless terminal's normal operation;
receiving, by the location server, a sample of light in the vicinity of the wireless terminal;
generating, by the location server, a characterization of reverberation in the vicinity of the wireless terminal based on the sample of sound in the vicinity of the wireless terminal;
generating, by the location server, a characterization of flicker in the vicinity of the wireless terminal based on the sample of light in the vicinity of the wireless terminal;
generating, by the location server, an estimate of the probability that the wireless terminal is indoors based on:

(1) the characterization of reverberation in the vicinity of the wireless terminal;
(2) the characterization of flicker in the vicinity of the wireless terminal, and generating, by the location server, an estimate of the location of the wireless terminal based on:
(1) the value of the location-dependent trait, and
(2) the estimate of the probability that the wireless terminal is indoors.

13. The method of claim 12 wherein the estimate of the probability affects a manner in which the value of the location-dependent trait is processed to generate an estimate of the location of the wireless terminal.

14. The method of claim 12 wherein generating an estimate of the location of the wireless terminal comprises:
generating an RF map that correlates each of a plurality of locations to the value of the predicted location-dependent trait associated with the wireless terminal at each such location; and
adjusting the RF map based on the estimate of the probability that the wireless terminal is indoors at least some of the locations.

15. An apparatus for generating an estimate of the location of a wireless terminal, the apparatus comprising:
a receiver for receiving:
(1) a value of a location-dependent trait of an electromagnetic signal, wherein the value of the location-dependent trait is dependent on the location of the wireless terminal,
(2) a sample of sound in the vicinity of the wireless terminal, and
(3) a sample of light in the vicinity of the wireless terminal;
a processor for generating:
(I) a characterization of reverberation based on the sample of sound in the vicinity of the wireless terminal and a characterization of flicker based on the sample of light in the vicinity of the wireless terminal,
(II) an estimate of the probability that the wireless terminal is indoors based on:
(1) the characterization of reverberation and the characterization of flicker, and
(III) the estimate of the location of the wireless terminal based on:
(1) the value of the location-dependent trait, and
(2) the estimate of the probability that the wireless terminal is indoors, wherein the estimate of the probability affects a manner in which the value of the location-dependent trait is processed to generate an estimate of the location of the wireless terminal; and
a transmitter for transmitting the estimate of the location of the wireless terminal for use in a location-based application.

16. The apparatus of claim 15 wherein the sample of sound is at least a portion of sound generated by the wireless terminal as a consequence of the wireless terminal's normal operation.

17. The apparatus of claim 15 wherein the processor for generating the estimate of the location of the wireless terminal further generates the estimate of location based on an adjustment to an RF map, wherein the RF map correlates each of a plurality of locations to the value of the predicted location-dependent trait associated with the wireless terminal at each such location, and wherein the adjustment is based on the estimate of the probability that the wireless terminal is indoors at least some of the locations.

18. A method of estimating the location of a wireless terminal, the method comprising:

receiving, by a location server, a value of a location-dependent trait of an electromagnetic signal, wherein the value of the location-dependent trait is dependent on the location of the wireless terminal;
receiving, by the location server, an estimate of the probability that the wireless terminal is indoors, wherein the estimate is based on a characterization of reverberation in the vicinity of the wireless terminal based on the sample of sound obtained in the vicinity of the wireless terminal; and
generating, by the location server, an estimate of the location of the wireless terminal by:
(1) generating an RF map that correlates each of a plurality of locations to the value of the predicted location-dependent trait associated with the wireless terminal at each such location; and
(2) adjusting the RF map based on the estimate of the probability that the wireless terminal is indoors at least some of the locations.

19. A method comprising:
receiving, by a location server, a value of a location-dependent trait of an electromagnetic signal, wherein the value of the location-dependent trait is dependent on the location of the wireless terminal;
receiving, by a location server, a characterization of reverberation in the vicinity of the wireless terminal;
generating, by the location server, an estimate of the probability that the wireless terminal is indoors based on the characterization of reverberation in the vicinity of the wireless terminal; and
generating, by the location server, an estimate of the location of the wireless terminal by:
(1) generating an RF map that correlates each of a plurality of locations to the value of the predicted location-dependent trait associated with the wireless terminal at each such location; and
(2) adjusting the RF map based on the estimate of the probability that the wireless terminal is indoors at least some of the locations.

20. A method comprising:
receiving, by a location server, a value of a location-dependent trait of an electromagnetic signal, wherein the value of the location-dependent trait is dependent on the location of the wireless terminal;
receiving, by the location server, a sample of sound in the vicinity of the wireless terminal, wherein the sample of sound is at least a portion of sound generated by the wireless terminal as a consequence of the wireless terminal's normal operation;
generating, by the location server, a characterization of reverberation in the vicinity of the wireless terminal based on the sample of sound in the vicinity of the wireless terminal;
generating, by the location server, an estimate of the probability that the wireless terminal is indoors based on the characterization of reverberation in the vicinity of the wireless terminal; and
generating, by the location server, an estimate of the location of the wireless terminal based by:
(1) generating an RF map that correlates each of a plurality of locations to the value of the predicted location-dependent trait associated with the wireless terminal at each such location; and
(2) adjusting the RF map based on the estimate of the probability that the wireless terminal is indoors at least some of the locations.

* * * * *